Figure 1:
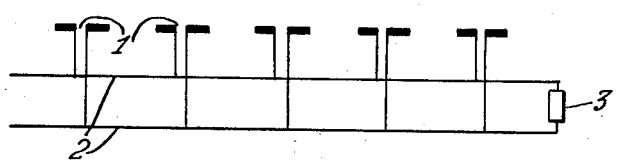

July 27, 1965

E. GOLDBOHM 3,197,774

RADAR SYSTEM UTILIZING A FREQUENCY
DISPERSIVE ARRAY

Filed Dec. 30, 1959

2 Sheets-Sheet 1

July 27, 1965
E. GOLDBOHM
3,197,774
RADAR SYSTEM UTILIZING A FREQUENCY
DISPERSIVE ARRAY
Filed Dec. 30, 1959
2 Sheets-Sheet 2
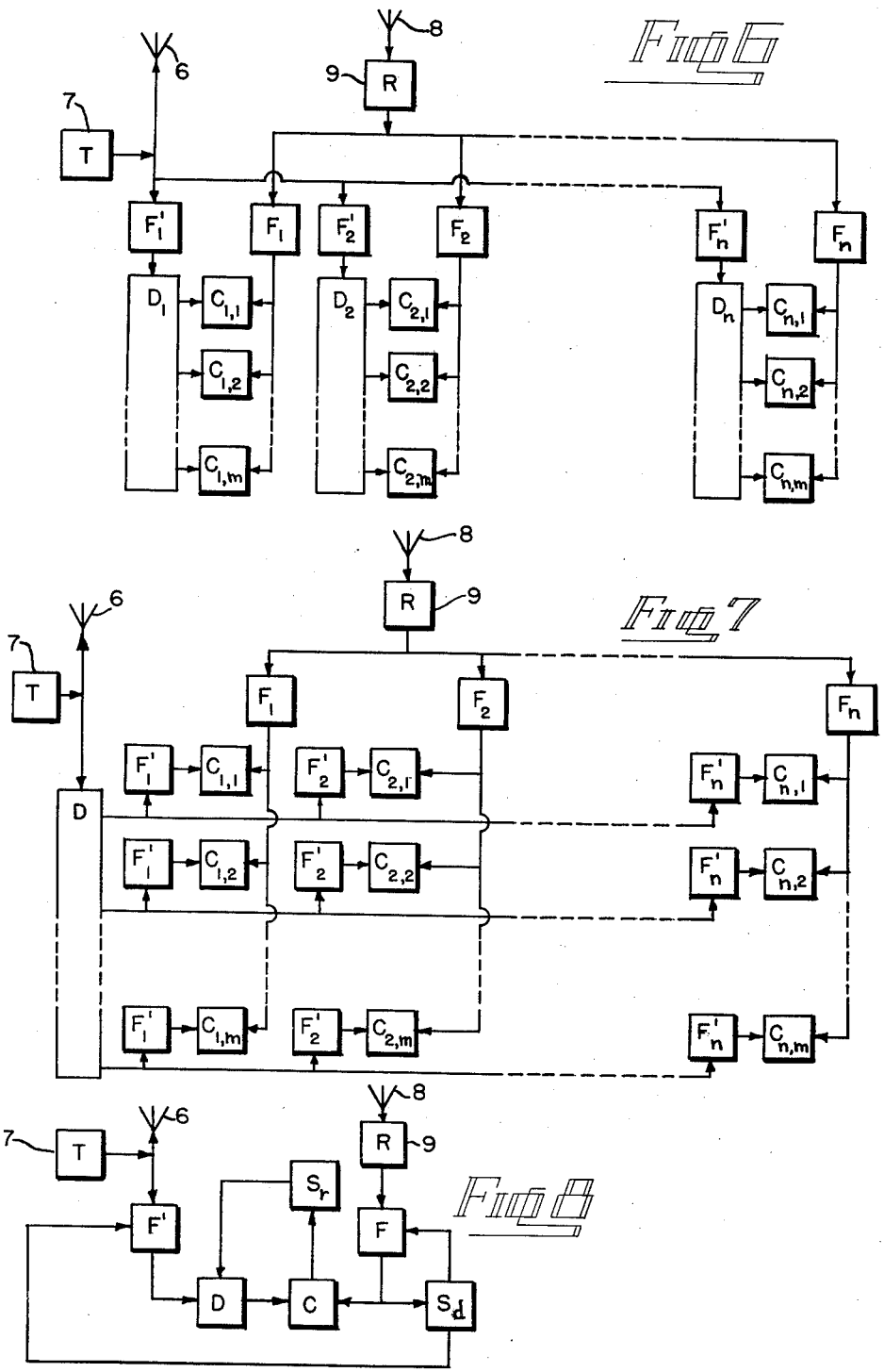

3,197,774
RADAR SYSTEM UTILIZING A FREQUENCY
DISPERSIVE ARRAY
Erich Goldbohm, 57 Koningin Astrid Blvd.,
Noordwijk, Netherlands
Filed Dec. 30, 1959, Ser. No. 862,858
Claims priority, application Netherlands, Jan. 5, 1959,
234,821
4 Claims. (Cl. 343—10)

The invention relates to a radar system, particularly to a radar system for observing targets at great distance.

For observing targets at great distance a large effective transmitted peak power and a low noise ratio of the radar receiver are of paramount importance. Moreover it is desirable that the flow of information be as continuous as possible.

A significant improvement in present noise factors is not to be expected. Although it would theoretically be conceivable to unlimitedly increase the transmitted power, this is accompanied by progressively increasing practical difficulties. Already for that reason alone the feasible effective range of a radar system is limited.

Further the pulse repetition frequency of pulsed radar systems should of course be low if large ranges are to be covered.

For instance, if a system is designed for observing targets at ranges up to 1000 kilometres, the pulse period should be at least 6.7 milliseconds. If it is further assumed that the lobe width of the radiated beam is 0.5 degree and that 8 hits per scan are necessary for perception of the target, it follows that the maximum permissible scanning speed of the beam is 1.6 revolutions per minute. A target which moves tangentially with a speed of for instance 12,000 kilometres per hour at the outer limit of the assumed range therefore moves over a distance which corresponds to 15 beam widths in the time within which the beam completes one revolution.

Therefore the information regarding a target of the stated nature is received strongly discontinuously. The same applies a fortiori for targets which move with the same linear velocity at shorter ranges.

A possible solution of the above problem would be to fill in the periods between successive pulses with a number of further pulses, which might be coded in order to enable to distinguish between them. The echoes resulting from these pulses could after reception be submitted to suitable time delays, whereafter they could be superimposed on each other, whereby in the ideal case a linear improvement of the signal/noise ratio could be obtained.

However, it will usually be impossible to generate all these pulses by means of one transmitter, unless the peak power thereof is correspondingly decreased.

Therefore the various pulses of each pulse sequence should be provided by separate transmitters. This would unduly complicate the transmitting part as well as the receiving part of the system.

Another problem is the way in which the beam rotation should be effected. If for instance a wave length of the order of 2 metres is adopted, the length of an antenna providing a beam width of .5 degree would be 260 metres, making mechanical rotation thereof virtually impracticable.

It is an object of the invention to provide a radar system which is suitable for observation of targets at extreme distances.

It is further an object of the invention to provide a radar system which provides a continuous flow of information about targets under observation.

It is a still further object of the invention to provide a radar system which obviates the need for mechanically rotating the antenna in order to effect a scanning action of the radiated beam.

In order to realize these and other objects a feature of the radar system according to the invention is the provision of a transmitter which continuously generates quasi-white noise. For the purposes of this invention quasi-white noise can be defined as a random noise signal which contains all frequencies within a certain band, each frequency being present with the same average power. Transmitting a continuous signal entails the necessity of employing a high mean power, but on the other hand the peak voltages are lower than in pulsed systems having the same mean power.

Figure 2:
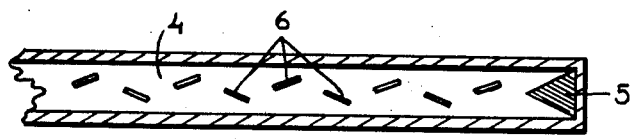
Figure 3:
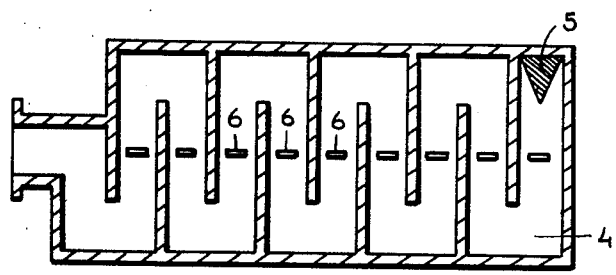
Figure 4:
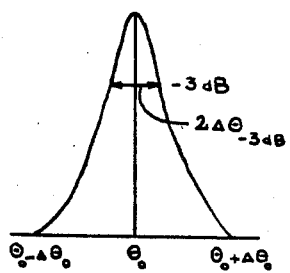

These and other features and advantages will be more apparent after a perusal of the following specification taken in connection with the accompanying drawing, wherein FIGURE 1 is a symbolic diagram of an antenna which is suitable for a radar system according to the invention, FIGURE 2 is a section through a different embodiment of an antenna which is suitable for a radar system according to the invention, FIGURE 3 is a section through a further embodiment of an antenna which is adequate for a radar system according to the invention, FIGURE 4 is a diagram of the radiation pattern of an antenna according to one of the FIGURES 1 through 3, FIGURE 5 is an illustrative diagram of the frequency spectrum which is radiated in a particular direction by the transmitting antenna, FIGURE 6 is a block diagram of a radar system according to the invention, FIGURE 7 is a block diagram of another radar system according to the invention, FIGURE 8 is a block diagram of an arrangement by means of which a filter for determining the direction in which an echo signal is received can be tuned under control of a servo system.

In order to be able to ascertain the direction of a target, the white noise generated by the transmitter can be applied to a non-resonant antenna array, e.g. a broadside array. Arrays of that kind can be designed for pronounced directivity, a beam width of .5 degree as mentioned above being easily attainable. For a given beam width the dimensions of an array as indicated are inversely proportional to the frequency of the signal applied to the array and therefore the dimensions may be quite large if a relatively low frequency is chosen (as appears from the above example), which in many cases makes a variation of the direction of the radiated beam by mechanical rotation of the antenna array impracticable. If, however, white noise is supplied to the antenna array a broad area can be covered by a stationary antenna, as will appear below.

If the distance between the individual radiating elements is correctly chosen and these elements are fed in a suitable way and the main radiation direction of the array will be dependent on the frequency of the signal applied thereto. Since white noise, and mutatis mutandis also quasi-white noise, the spectrum of which is limited to a given bandwidth, contains components of all frequencies included between two limit values, the noise energy is radiated over a sector which can be much broader than the beam width of the array at one frequency.

In that case the highest frequencies contained in the noise spectrum are radiated along one boundary of the sector and the lowest frequencies contained in the noise spectrum are radiated along the other boundary of the sector.

An array of the kind described is diagrammatically shown in FIGURE 1. The individual elements are indicated at 1 and are fed via a feeder 2, which is terminated by an impedance 3. Many embodiments of the radiating elements 1 and the feeder 2 of FIGURE 1 are conceivable. Independent of the actual embodiment employed the array of radiating elements 1 will exhibit frequency-dispersing properties i.e. the main direction of radiation will be different for each frequency within the noise band supplied if the array is designed properly. An embodiment of an array as described is shown in FIGURE 2.

In FIGURE 2 the feeder 2 of FIGURE 1 is replaced by a wave guide 4, one extremity of which is terminated by a wedge 5 of resistive material. Slots 6 are provided in the walls of the wave guide 4, said slots acting as radiating elements. In this embodiment the dispersing properties of the array are not only due to the positioning of the radiating elements 6, but also due to the dispersing properties of the wave guide 4 itself.

A slotted radiator as described above, which is designed to have a beam width of .5 degree at a frequency of 9,300 megacycles per second will show a beam deviation with respect to the direction at right angles to the array of −9.2 degrees and +6.9 degrees respectively if the frequency is decreased to 8,400 megacycles per second or increased to 10,200 megacycles per second respectively.

Therefore the sector covered by an array of the above nature, if a noise spectrum extending from 8,400 megacycles per second to 10,200 megacycles per second is applied thereto, has a width of approximately 16 degrees, which corresponds to a beam scan of 32 beam widths. This can be effected by a frequency deviation of ±10%, without entailing the necessity of mechanically influencing the array.

The same beam scan can be obtained by smaller frequency deviations if, maintaining the same geometrical spacing of the individual radiating elements, the electrical spacing thereof is increased. This can be effected by arranging the slots in a repeatedly folded wave guide, as shown in FIGURE 3.

Any of the arrays according to one of the FIGURES 1 through 3 or their equivalents radiate each frequency component in a different direction. The directional pattern for an arbitrary frequency within the noise band employed is shown in FIGURE 4. From this bell-shaped radiation pattern it appears that the frequency considered is predominantly radiated in the direction $\theta_0$. However, an infinite number of frequencies are present within the noise band, each of which is radiated in a different direction.

Figure 5:
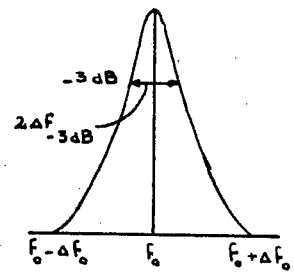

A target which is located in a given direction with respect to the array (for instance $\theta_0$ of FIGURE 4) will accordingly receive a frequency spectrum as shown in FIGURE 5. This spectrum, which bears a marked similarity to the diagram of FIGURE 4, indicates that the frequency $f_0$ (in this case the same frequency as considered in FIGURE 4) is predominant.

If the target is located in a different direction with respect to the array a different frequency will predominate. This spectrum is reflected by the target and can at the location of the transmitting antenna array be received by a further antenna array, which usually will be similar to the transmitting array or may even consist of the same array as employed for transmitting purposes. The reflected spectrum is therefore again submitted to the filtering action according to FIGURE 5 on reception.

Computation shows that in the numerical examples described above the half power width of the received frequency spectrum equals 27 megacycles per second.

If, however, a mean wave length of $\lambda=2$ metres is chosen instead of $\lambda=3.2$ centimetres the half power width of the noise spectrum received from any direction is merely .5 megacycle per second.

The direction from which any given echo is received can readily be ascertained by spectrum analysis.

By means of tunable filters the entire sector can be searched for targets, while it is also possible to operate one or more of these filters by servo-systems, whereby a target can be tracked automatically once it has been observed.

The angular discrimination of the array is to a first approximation equal to the beam width of the array, however, the characteristics of the filters employed are also important in this regard.

The measurement of the range of a target is based on the fact that the characteristics of the generated noise spectrum are specific for the time of generation, in other words there is no correlation between the noise generated at different instants, provided that the time interval between these instants be large enough not to give rise to false correlation due to physical limitations.

From the radiated noise spectrum that part is singled out by means of a filter, which corresponds to the spectrum as received from the direction in which a target has been observed. Said part of the spectrum is delayed by means of a variable delay line (which of course should have adequate band width) and is compared to the echo in a correlator circuit. The delay line is so adjusted that a maximum correlation occurs, in which case the time of travel over the route antenna-target-antenna is equal to the actual delay time of the delay line, which is indicated on the adjusting means of the delay line and from which the range of the target can readily be computed. The range discrimination which can be obtained in this way is substantially equal to $$\frac{2}{\Delta f}$$

microseconds. It is also possible to adjust the delay line by means of a servo system, whereby the range of a target can also be tracked automatically.

In FIGURE 6 the transmitting antenna array 6, which corresponds to the arrays shown in FIGURES 1, 2 or 3, is fed from a noise transmitter 7. Echo signals are picked up by a similar antenna array 8, which is so arranged that its effective directions correspond to those of the array 6. The echo signals picked up by the array are amplified in a receiver 9 and supplied to a plurality of filters $F_1, F_2 \ldots F_n$. The pass characteristics of these filters are such that these filters pass only signals within a narrow frequency range. Since any target is irradiated with noise signals from within a narrow frequency range as shown in FIGURE 5 due to the dispersive properties of the transmitting antenna and the signals from such target are once again restricted in frequency range on reception due to the frequency dispersive properties of the receiving antenna the spectrum received from each target is much narrower than the noise spectrum generated by the transmitter and each of the filters $F_2 \ldots F_n$ passes only echoes from a particular direction. Therefore the direction of the target can be ascertained by checking which of the filters $F_1, F_2 \ldots F_n$ passes an echo signal.

The range of the target can be ascertained in the following way:

Each of the filters $F_1, F_2 \ldots F_n$ is connected to the first inputs of a column of correlator circuits C. The filter $F_1$ is connected to a column of correlator circuits $C_{1,1}, C_{1,2} \ldots C_{1,m}$, the filter $F_2$ is connected to the first inputs of a column of correlator circuits $C_{2,1}, C_{2,2}, \ldots C_{2,m}$ and so on to the filter $F_n$, which is connected to the first inputs of a column of correlator circuits $C_{n,1}, C_{n,2} \ldots C_{n,m}$.

Filters $F'_1, F'_2, \ldots F'_n$ select corresponding frequency bands from the output signal of the noise transmitter 7 as are passed by the filters $F_1, F_2 \ldots F_n$. Since the echo signals passed through the filters $F_1, F_2 \ldots F_n$ have been filtered twice, i.e. once by the dispersive action of the antenna array 6 and once by the filter $F_1, F_2 \ldots F_n$ the filters $F'_1, F'_2 \ldots F'_n$ have a pass characteristic which is approximately the square of the pass characteristic of the filters $F_{1,2} \ldots F_n$ respectively. The output of each of the filters $F'_1, F'_2 \ldots F'_n$ is passed to a delay line D. Thus the output of the filter $F'_1$ is connected to the input of a delay line $D_1$, the output of the filter $F'_2$ is connected to the input of a delay line $D_2$ and so on to the filter $F'_n$, the output of which is connected to the input of a delay line $D_n$.

Each delay line has several taps of different delay times, which are each connected to the second input of one of the correlator circuits in the corresponding column. Maximum correlation will only be obtained if the delay introduced by the delay line is equal to the travelling time of the echo signal. Thus, if an echo signal is passed by for example the filter $F_1$ all correlator circuits $C_{1,1}, C_{1,2} \ldots C_{1,m}$ receive a corresponding frequency spectrum through the filter $F'_1$ and the delay line $D_1$, however, with different time delays. Only the correlator circuit, the second input of which is delayed by an amount which is equal to the travelling time of the echo signal will show maximum correlation. Thus the range of a target can be ascertained from the row number of the correlator showing maximum correlation, while the direction of the target can be ascertained from the column number of the correlator showing maximum correlation. Since several correlators may show maximum correlation at the same time it is possible to detect several targets simultaneously.

If there are $x$ directions and $y$ ranges to be distinguished the system would comprises $x$ filters F, $x$ filters F', $x$ delay lines D and $xy$ correlators.

An alternative system is shown in FIGURE 7. Corresponding components have been indicated with corresponding reference numerals.

In this arrangement the output signal of the noise transmitter 7 is supplied directly to a single delay line D. Each tap of the delay line D is connected to the second input of each correlator circuit C of the same row through an appropriate filter F'. Thus, the correlators $C_{1,1}, C_{1,2} \ldots C_{1,m}$ are connected to different taps of the delay line D through filters $F'_1$, the pass characteristics of which are the square of the pass characteristic of the filter $F_1$ which co-operates with these correlators. The remaining correlators are similarly connected.

This arrangement makes it possible to restrict the number of delay lines to one at the expense of increasing the number of filters F' to $xy$. Otherwise the arrangement operates exactly as discussed in relation to FIGURE 6.

In some cases it may not be sufficient to detect targets and ascertain the range and direction of them, but it may also be required to keep track of these targets automatically.

In that case one or more arrangements as shown in FIGURE 8 may be added to the system. In FIGURE 8 the same notation has been used as in FIGURES 6 and 7. The receiver 9 supplies echo signals to the first input of a correlator C through a tunable filter F. This filter selects echoes from a single direction. The filter is tuned by a servo system $S_d$ which keeps the filter tuned to the received noise spectrum, regardless of the frequency variations of that spectrum which are caused by movement of the target. Thus the setting of the filter F gives a continuous indication of the direction of the target. The second input of the correlator C receives a delayed portion of the noise signals generated by the transmitter 7 through a filter F', the pass characteristic of which is the square of the pass characteristic of the filter F, and a variable delay device D, the delay of which is continuously adjusted by a servo system $S_r$ so as to keep the degree of correlation in the correlator C maximum. Thus the delay introduced by the delay device D is maintained equal to the travelling time of the echo, whereby the setting of the delay service D gives a continuous indication of the range of the target. In order that corresponding frequency spectrums be fed to the correlator inputs the filter F' is adjusted by the servo system $S_d$ in the same way as the filter F.

An arrangement as shown in FIGURE 8 can keep track of one target. If more targets are to be tracked simultaneously, a corresponding number of arrangements according to FIGURE 8 should be included in the system.

A peculiar and very desirable property of the described system is that the antenna array covers a board sector, whereby a large area is kept under observation, while at the same time the high gain which can be obtained by means of broadside arrays is effective over the entire sector.

It is true that a mechanically rotated antenna having a small beam width and consequently a high gain is also able to cover a broad sector, but this has the disadvantage that the information is discontinuously available, as already explained above.

Therefore the system described should be compared to another type of system, which is also able to keep the entire sector under continuous observation.

For the purpose 32 reflector antennas, each having a beam width of .5 degree could be employed. If it is conditioned that the dimensions of both arrays be comparable, each of the reflector antenna would have an effective area of $\frac{1}{32}$ part of the effective area of the array of the system according to the invention. If the effective area of the antenna of the system according to the invention is termed $A_1$ and the effective area of each of the reflector antennas is termed $A_2$ this implies that $$A_1 = 32 . A_2$$

The power which is available for each direction at the antenna input is assumed to be equal in both cases, so $P_1 = P_2$. Further it is assumed that both systems operate at the same frequency.

It then follows from the radar equation that $$R_1 = \sqrt[4]{\frac{P . \pi . A_1{}^2}{4 . \pi . S_1 . \lambda^2}}$$

and $$R_2 = \sqrt[4]{\frac{P . \pi . A_2{}^2}{4 . \pi . S_2 . \lambda^2}}$$

so if $S_1 = S_2$ it follows that $R_1 = 5.6 R_2$, which signifies that, assuming equal noise levels of the receivers of both systems, the system according to the invention has a range 5.6 times larger than a system consisting of a number of reflector antennas.

The system described not only enables one to obtain information about the location of a target at any desired instant, but the radial and tangential speeds of the target are also directly available, since the speeds with which the filter and the delay line respectively are adjusted by their servo system is an indication of the two components of the target speed.

A maximum correlation is obtained if the delay line is kept adjusted optimally, if the frequency selective filters are kept adjusted optimally and if the target has no radial speed component, for that would give rise to Doppler effect, whereby the echo spectrum would be shifted in frequency.

If the target has a radial speed component, as will generally be the case, the Doppler effect introduced thereby could be compensated on reception of the echoes by introducing an equal and opposite frequency shift. This frequency shift can be introduced by a frequency-independent phase shifting device as is well known to those versed in the art. If the correct frequency shift has been introduced the correlation will again be maximum and the sign and magnitude of the introduced frequency shift will then be an indication of the radial speed component of the target.

As regards the sensitivity of the system according to the invention to man-made external interference ("jamming") the following is pointed out.

If the interfering party knows the correct frequency which is radiated in his direction he could radiate that frequency himself. This would indeed cause interference in the system according to the invention, however, only in that one direction. Broadbanded interference is less effective since only that part thereof is received which corresponds to the spectrum radiated in the direction of the interfering transmitter, whereby a large part of the interference energy is wasted.

Receiving the signals originating from the system according to the invention and re-radiating these signals after amplification (for instance by means of a travelling wave tube) has no effect, since in that case the correlation is maintained and the interfering transmitter consequently can easily be detected.

Since many changes could be made in the above invention and many apparently widely different embodiments of this invention could be adopted without departing from the scope thereof, it is intended that all matter contained in the above description or shown in the accompanying drawings shall be interpreted as illustrative and not in a limiting sense.

What I claim is:

1. A radar system having an antenna array comprising a plurality of aligned individual radiating elements and a transmitter providing a noise spectrum to that array, the array being frequency dispersive such that each frequency component from the noise spectrum is radiated in a different direction, a receiver, at least one filter being included in said receiver, the pass band of said filter being narrow as compared with the frequency spectrum generated by the transmitter, at least one correlator circuit having a first input to which the output of said filter is connected and a second input, a second filter connected to the transmitter output and a delay device between the second filter and said second input of the correlator circuit, the pass characteristic of which second filter is substantially equal to the shape of the frequency spectrum passed by the filter connected to the first input of the correlator circuit.

2. A radar system having an antenna array comprising a plurality of aligned individual radiating elements and a transmitter providing a noise spectrum to that array, the array being frequency dispersive such that each frequency component from the noise spectrum is radiated in a different direction, a receiver, as least one tunable filter being included in said receiver, the pass band of said filter being narrow as compared with the frequency spectrum generated by the transmitter, a servo system which responds to the magnitude of the signals passed by said filter for adjusting the filter, at least one correlator circuit having a first and a second input to the first of which the output of said filter is connected, a second filter connected to the transmitter output, a delay device connected in between the second filter and the second input of the correlator circuit, the pass characteristic of which further filter is substantially equal to the shape of the frequency spectrum passed by the filter connected to the first input of the correlator circuit.

3. A radar system having an antenna array comprising a plurality of aligned individual radiating elements and a transmitter providing a noise spectrum to that array, the array being frequency dispersive such that each component from the noise spectrum is radiated in a different direction, a receiver, at least one first tunable filter being included in said receiver, the pass band of said filter being narrow as compared with the frequency spectrum generated by the transmitter, a servo system which responds to the magnitude of the signals passed by said filter for adjusting the filter, at least one correlator circuit having a first and a second input to the first of which the output of said filter is connected, a delay device, and a second tunable filter, said delay device and said second tunable filter being connected in cascade between the transmitter output and said second input of the correlator circuit, said second filter having a pass band substantially equal in shape and frequency to the pass band of said first tunable filter.

4. A radar system having an antenna array comprising a plurality of aligned individual radiating elements and a transmitter providing a noise spectrum to that array, the array being frequency dispersive such that each frequency component from the noise spectrum is radiated in a different direction, a receiver, at least one filter being included in said receiver, the pass band of said filter being narrow as compared with the frequency spectrum generated by the transmitter, at least one correlator circuit having a first input to which the output of said filter is connected, said correlator circuit having a second input, a delay device, a second filter, said delay device and said second filter being connected in cascade between the transmitter output and the second input of the correlator circuit, the pass characteristic of said second filter being substantially equal to the pass characteristic of the filter connected to said first input of the correlator circuit.

References Cited by the Examiner

UNITED STATES PATENTS

| | | | |
|---|---|---|---|
| 2,253,975 | 8/41 | Guanella | 250—17 |
| 2,403,728 | 7/46 | Loughren | 343—100 |
| 2,422,691 | 6/47 | Mason | 343—102 |
| 2,429,726 | 10/47 | Lewis | 343—100 |
| 2,433,804 | 12/47 | Wolff | 343—100 |
| 2,584,004 | 1/52 | Enslein. | |
| 2,596,480 | 5/52 | Guptill et al. | 343—771 |
| 2,721,321 | 10/55 | Page | 343—100 |
| 2,768,372 | 10/56 | Green | 343—100.7 |
| 2,777,122 | 1/57 | Heldman et al. | 343—777 |
| 2,881,436 | 4/59 | Stavis | 343—771 |
| 3,119,998 | 1/64 | Foley | 343—16 |

FOREIGN PATENTS 724,555   2/55   Great Britain.

KATHLEEN H. CLAFFY, *Primary Examiner.*

CHESTER L. JUSTUS, *Examiner.*